May 31, 1932.  J. P. WALKER  1,860,726

CONVERSATION SEPARATOR SYSTEM

Filed Sept. 18, 1930   2 Sheets-Sheet 1

Inventor
Jay P. Walker

By Jack A. Ashley
Attorney

Patented May 31, 1932

1,860,726

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

CONSERVATION SEPARATOR SYSTEM

Application filed September 18, 1930. Serial No. 482,778.

This invention relates to a conservation separator system, and particularly to an assemblage of devices for the automatic separation of water and gas from crude oil in the flow of the oil through the system.

The invention is designed for use in connection with oil wells where the flow of crude oil carries with it water, gas and sand. The splashing or agitation of these elements causes the oil to cut or emulsify and renders it difficult to separate the water therefrom before its passage to a tank or pipe line. Such separation usually requires the use of steam heated settling tanks and frequently the application of chemicals involving a material expense and great loss of time.

I have therefore found it of practical importance to provide a system to expedite the separation and avoid any violent agitation of the crude oil while securing the maximum conservation of the products and effecting a clean separation thereof. I avoid the necessity for a long settling period by flowing the crude oil through a separating tank wherein the gas is collected at the upper portion and the water separated from the oil by a gravity action at the lower portion which is facilitated by the use of a series of baffles. This system also conserves the time and expense incident to the production of the dehydrated oil by removing the gas and water therefrom in the minimum of time and by an automatic operation which is controlled by the use of automatic oil and water level regulators. When the condition of the crude oil requires heating to facilitate the removal of emulsified water, such water when discharged is used to automatically cool the dehydrated oil before its delivery to a storage tank or pipe line.

The invention has for an object to provide a novel and improved separating system including a tank having a gas separator at its upper portion and a water separator at its lower portion with an automatic level regulator controlling the discharge of water therefrom.

A further object of the invention is to provide a system including a tank having a gas chamber at its upper portion with a crude oil discharge toward its base, water separating baffles disposed between said discharge and an oil outlet, an automatic level regulator below the oil and water levels therein, and an automatic oil level regulator connected at the oil level, whereby an effective separation is secured in the flow of oil through the separating tank.

Another object of the invention is to present an automatically operating system including a tank having a gas separator at its upper portion and a water separator at its lower portion, an oil discharge intermediate of said separators, heating means disposed at the water separator, and a water outlet from the tank arranged to discharge upon cooling coils in the oil discharge pipe.

Other and further objects and advantages of the invention will be hereinafter set forth and the novel features thereof defined by the appended claims.

In the drawings—

Figure 3 is a similar view through the water level regulator;

Like numerals refer to like parts in the several figures of the drawings.

Figure 1:
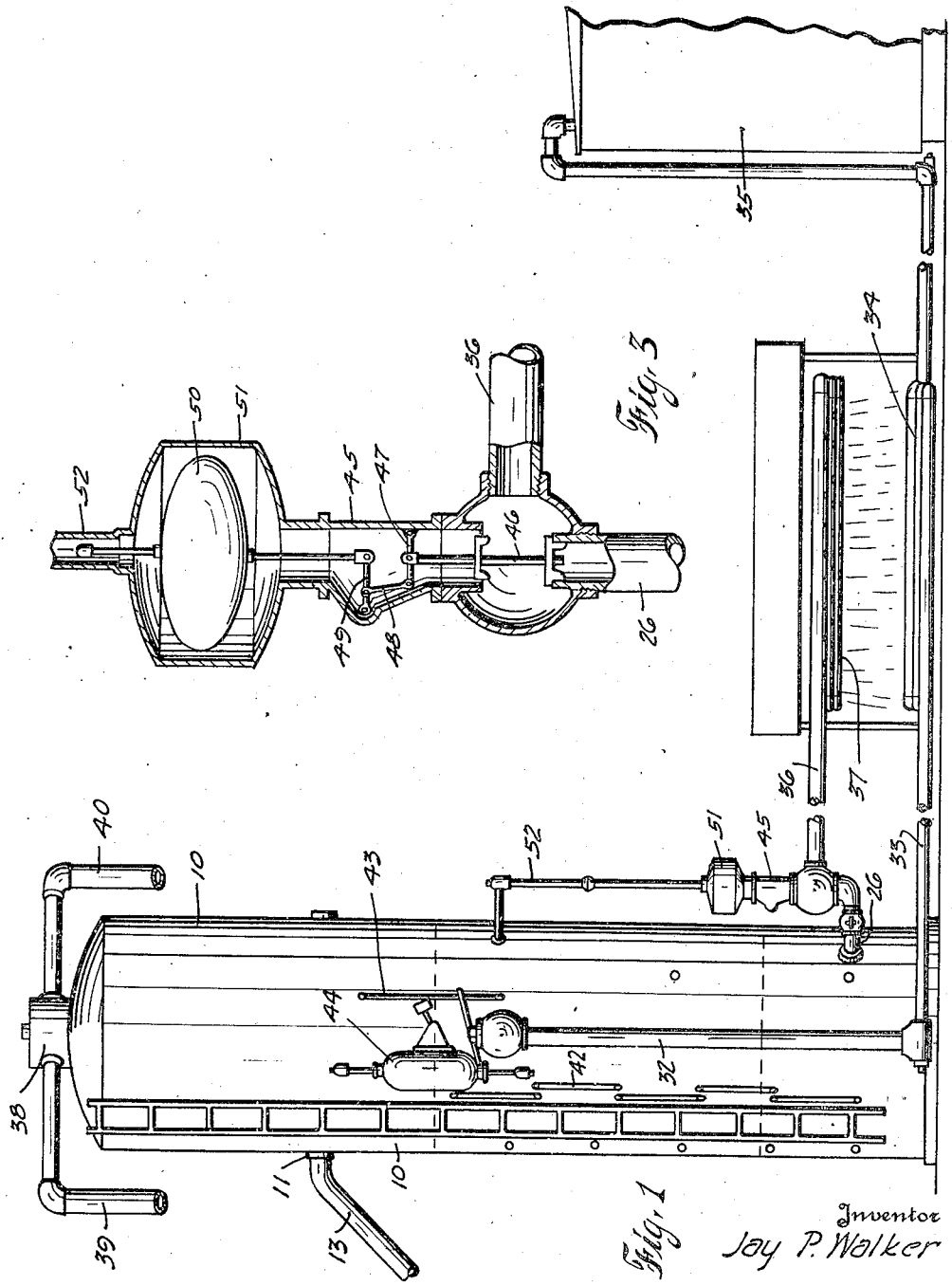
Figure 1 is an elevation of the system.
Figure 2:
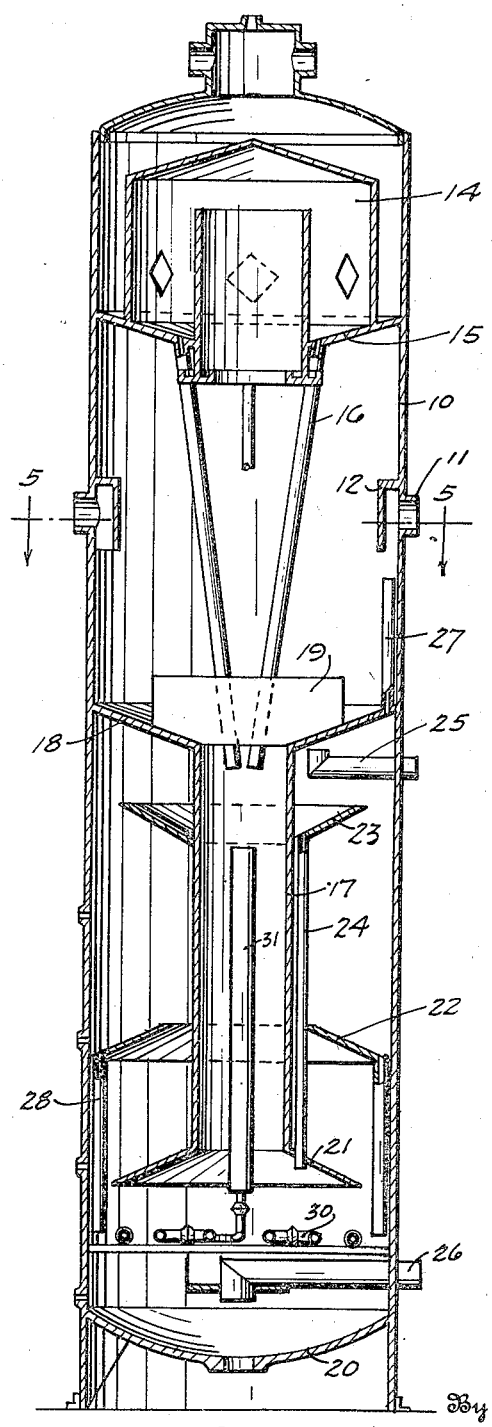
Figure 2 is a vertical section through the separator.
Figure 4:
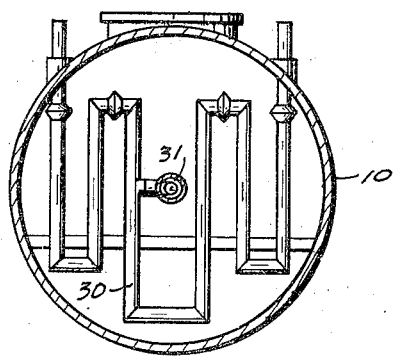
Figure 4 is a detail plan of the heating coil for the separator.
Figure 5:
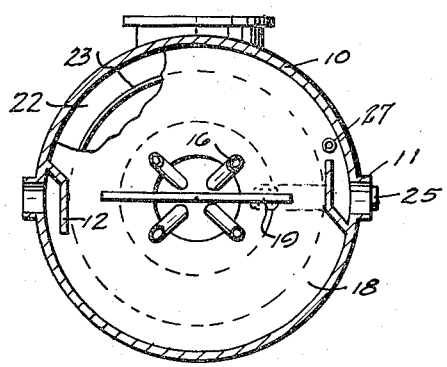
Figure 5 is a section on line 5—5 of Figure 2.

The numeral 10 designates the separating tank which may be of any desired size or configuration, and the specific construction thereof forms the subject of a separate application. At a point above its midheight the tank is provided with the crude oil inlets 11 at opposite sides which are protected by a boxing 12 open at its bottom and one side to cause a lateral downward flow of the oil. Connected with the inlets is a feed line 13 from an oil well. At the upper portion of the tank a gas separator 14 is located and the structure thereof forms the subject of an independent application. The trough 15 of this separator drains downwardly any liquid which may collect therein through the pipes 16 which discharge into the stack 17 which depends from the hopper bottom 18 beneath the inlets. This hopper is formed with a baffle plate 19 to prevent any whirling motion of the water and oil which would tend to emulsify the same.

The stack 17 discharges above the bottom 20 of the tank and is there formed with a hood 21 which permits the bulk of water to settle to the bottom of the tank and the oil to rise and pass through the space between the baffle 22 and the stack. Any water which may collect upon this baffle is drained back by the pipes 28 and the rising oil is outwardly deflected by the upper baffle 23 which is likewise provided with a return drain pipe 24. An outlet pipe 25 for the dehydrated oil is located beneath the hopper and has an upwardly directed opening within the tank. A gas vent 27 extends through and above the hopper. At the base of the tank a water outlet 26 is disposed with a downwardly directed inlet.

Under some conditions of use it is desirable to heat the crude oil to facilitate the separation of the water therefrom, and this may be accomplished by means of a coil 30 supported beneath the hood 21 and having a vertical stand pipe 31 for heating the body of oil. The oil outlet 25 is connected by a vertical pipe 32 with an oil line 33 formed with coils 34 and adapted to discharge into a storage tank 35. The water outlet 26 is connected with a valve casing 26' which in turn is connected with a discharge pipe 36 provided with perforated spraying coils 37 disposed about the cooling coils 34 of the oil line. The dome 38 of the gas separator is formed with a conducting line 39 to a gasoline plant and a line 40 for the release of excess gas. Any suitable chemical or lubricating means (not shown) may be connected in the feed line 13 when the emulsified condition of the oil renders the same desirable.

The tank is provided at the water level with a series of gage glasses 42 and a similar glass 43 at the oil level. The vertical pipe 32 at this point is provided with an automatic oil level regulator 44 of usual construction, while the water discharge pipe 36 is provided with a water level regulator 45. As shown in Figure 3 the regulator 45 includes a double valve member 46 engaging in a bonnet 46' in the casing 26' and having its stem pivoted to a lever 47 connected by a link 48 to a lever 49 which carries a float 50 within the casing 51. This casing is connected by a valve controlled pipe 52 with the tank below the oil level thereof. The float is partially filled with a liquid, such as salt water from the well, so that it will not be sufficiently buoyant to raise the valve when submerged in clean oil, but will have ample buoyancy to raise the float and valve when the former is submerged in water. The degree of buoyancy of the float is varied relative to the specific gravity of the oil treated while the greater gravity of the salt water provides a positive operation of the valve by the weighted float. The lever connection between the float and valve also assists such operation by producing increased leverage.

The operation of the system will be apparent from the foregoing description and it will be generally seen that the gas is separated from the inflowing oil at the top of the tank and the crude oil passes downward through the stack to the water chamber where the hood and baffles effect a retarded movement to permit gravity separation of the water therefrom and the separated oil rises to the outlet at the oil level which is controlled by an automatic regulator. A similar regulation is effected at the water outlet from the base and the discharged water used to automatically cool the separated oil when desired.

The invention therefore contemplates an automatic method of continuous separation of gas, water and sand from the oil which conserves time and expense in operation and produces the most desirable product in the cleaned oil. This method includes the feeding of the stock oil into a container and the withdrawal of the gas and water at different points therefrom, while the flow of the oil mixture is retarded to permit sufficient period for the gravity separation and collection of the foreign matters removed from the oil. The method also provides for the use of the separated water for cooling the oil after its separation, particularly when heating of the stock oil has been necessary.

While the details of the separator and other parts have been specifically shown and described the invention is not confined thereto as changes and alterations may be made therein without departing from the spirit of the invention as recited in the following claims.

What I claim, is:

1. In an automatic separating system, a tank having a gas separator at its upper portion and a gravity water separator at its lower portion, a feed connection intermediate said separators and delivering crude oil to the water separator, an outlet for the separated oil at the upper portion of the water separator, means for collecting and conducting remaining water from the oil rising above the water in the gravity separator, a water outlet from the lower portion of the water separator, an automatic level regulator connected to the water outlet and to the tank, and an automatic oil level regulator connected at the oil outlet from the tank.

2. In an automatic separating system, a tank having an automatic gas separator and a gravity water separator, an oil feed connection to said tank, a heater in said water separator, a pipe line for separated oil having a cooling coil, and a pipe line from the water separator discharging upon said coil.

3. In an automatic separating system, a tank having an automatic gas separator and a gravity water separator, a crude oil feed connection to said tank, a heater in the water separator, a storage tank, a pipe line extending from the oil level of the separating tank to the storage tank and provided with a cooling coil, and a discharge pipe from the water separator having perforated coils disposed above the coil of the oil pipe line.

4. In an automatic separating system, a tank having an automatic gas separator and a gravity water separator, a crude feed connection to said tank, a pipe line for separated oil having a cooling coil, a pipe line from the water separator discharging upon said coil, and a float controlled valve for the water pipe line adapted to be opened when the water level within the tank reaches the level of the float.

In testimony whereof I affix my signature.

JAY P. WALKER.

CERTIFICATE OF CORRECTION.

Patent No. 1,860,726.   May 31, 1932.

Jay P. Walker.

It is hereby certified that error appears in the printed specification of the above numbered patent requiring correction as follows: In the drawings, Sheet 1, the Fig. 3, should appear as shown below instead of as shown in the patent-

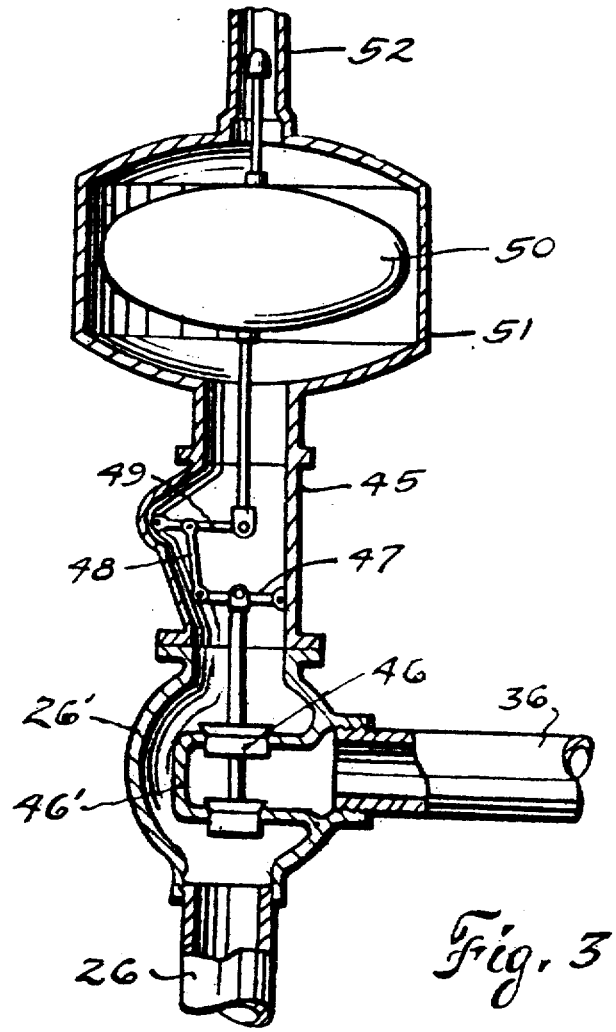

and that the said Letters Patent should be read with this correction therein that the same may conform to the record of the case in the Patent Office.

Signed and sealed this 16th day of August, A.D. 1932.

M. J. Moore, (Seal)   Acting Commissioner of Patents.